United States Patent
Zoratti et al.

(10) Patent No.: US 11,709,960 B2
(45) Date of Patent: Jul. 25, 2023

(54) CORRECTNESS-PRESERVING SECURITY FOR GRAPH DATABASES

(71) Applicant: Neo4j Sweden AB, San Mateo, CA (US)

(72) Inventors: Ivan Zoratti, Windsor (GB); Louise Söderström, Malmö (SE); Craig Taverner, Billesholm (SE); Olivia Ytterbrink, Malmö (SE)

(73) Assignee: Neo4j Sweden AB, San Mateo, CA (US)

( * ) Notice: Subject to any disclaimer, the term of this patent is extended or adjusted under 35 U.S.C. 154(b) by 220 days.

(21) Appl. No.: 17/150,983

(22) Filed: Jan. 15, 2021

(65) Prior Publication Data

US 2022/0012354 A1   Jan. 13, 2022

Related U.S. Application Data

(60) Provisional application No. 63/101,240, filed on Jul. 7, 2020.

(51) Int. Cl.
*G06F 21/62* (2013.01)
*G06F 21/60* (2013.01)
*G06F 16/901* (2019.01)

(52) U.S. Cl.
CPC ...... *G06F 21/6227* (2013.01); *G06F 16/9024* (2019.01); *G06F 21/604* (2013.01)

(58) Field of Classification Search
CPC ............. G06F 21/6227; G06F 16/9024; G06F 21/604; H04L 63/083; H04L 63/102
See application file for complete search history.

(56) References Cited

U.S. PATENT DOCUMENTS

| | | | | |
|---|---|---|---|---|
| 10,447,730 | B2* | 10/2019 | Gupta | G06F 21/552 |
| 2012/0096002 | A1* | 4/2012 | Sheehan | G06Q 50/01 |
| | | | | 707/E17.046 |
| 2014/0074888 | A1* | 3/2014 | Potter | G06F 16/2423 |
| | | | | 707/779 |
| 2014/0280360 | A1* | 9/2014 | Webber | G06F 16/28 |
| | | | | 707/798 |
| 2015/0026145 | A1* | 1/2015 | Prakash | G06F 16/951 |
| | | | | 707/723 |
| 2015/0074888 | A1* | 3/2015 | Coulter | E03D 9/038 |
| | | | | 4/223 |
| 2016/0337400 | A1* | 11/2016 | Gupta | H04L 63/1416 |
| 2017/0091470 | A1* | 3/2017 | Infante-Lopez | G06Q 50/01 |
| 2018/0032930 | A1* | 2/2018 | Kolb | G06F 40/253 |
| 2018/0052885 | A1* | 2/2018 | Gaskill | G06N 5/04 |
| 2018/0239507 | A1* | 8/2018 | Bui | G06F 3/0482 |
| 2019/0272296 | A1* | 9/2019 | Prakash | G06F 16/90335 |
| 2019/0384863 | A1* | 12/2019 | Sirin | G06V 10/776 |

* cited by examiner

*Primary Examiner* — J. Brant Murphy
(74) *Attorney, Agent, or Firm* — Van Pelt, Yi & James LLP

(57) ABSTRACT

Techniques are disclosed to provide correctness-preserving security for graph databases. In various embodiments, security context data associated with a user with respect to a graph database is stored. A query associated with the user with respect to the graph database is received. A path is allowed to be traversed in connection with responding to the query based at least in part on a grant of a traversal right, reflected in the security context data, to traverse one or more of a node and a relationship included in the path.

21 Claims, 15 Drawing Sheets

US 11,709,960 B2

CORRECTNESS-PRESERVING SECURITY FOR GRAPH DATABASES

CROSS REFERENCE TO OTHER APPLICATIONS

This application claims priority to U.S. Provisional Patent Application No. 63/101,240 entitled CORRECTNESS-PRESERVING SECURITY FOR GRAPH DATABASES filed Jul. 7, 2020 which is incorporated herein by reference for all purposes.

BACKGROUND OF THE INVENTION

A graph database is a computerized record management system that uses a network structure with nodes, relationships, labels, and properties to represent data. A node may represent an entity such as a person, a business, an organization, or an account. Each node has zero or more labels that declare its role(s) in the network, for example as a customer or a product. Nodes have zero or more properties which contain user data. For example, if a node represents a person, the properties associated with that node may be the person's first name, last name, and age. Relationships connect nodes to create high fidelity data models. Relationships are directed, have a type which indicates their purpose and may also have associated property data (such as weightings).

Graph databases have various applications. For example, a graph database may be used in healthcare management, retail recommendations, transport, power grids, integrated circuit design, fraud prevention, and a social network system, to name a few.

Graph databases have traditionally previously used rudimentary security methods in the form of black/white lists to allow or disallow read or write access to data on behalf of a user or role. For example, a user may be authorized to read certain relationship types and node labels which limit the extent of their queries.

However, reading actually embodies two distinct concepts: the ability to retrieve a node or relationship on behalf of the user (returning data to the user) and the ability to traverse that node or relationship on behalf of the user (continuing to query along a path on behalf of the user). This conflation of responsibility leads to security policies that are either more liberal than desired (users can read data that really they ought not), or more draconian (users cannot read data and so partial or incorrect results are returned).

Graph databases users often try to model advanced security permissions by writing a "security layer" into the graph, which defines the permitted traversal of the target graph for a given user. However, such a model is expensive to create and maintain and requires queries to be written to be explicitly aware of the security layer. Malignant operators can easily bypass this layer by writing queries directly against the domain data. Since the graph database does not enforce the security layer, it is secure only by convention and is not a good solution.

BRIEF DESCRIPTION OF THE DRAWINGS

Various embodiments of the invention are disclosed in the following detailed description and the accompanying drawings.

DETAILED DESCRIPTION

Figure 1:
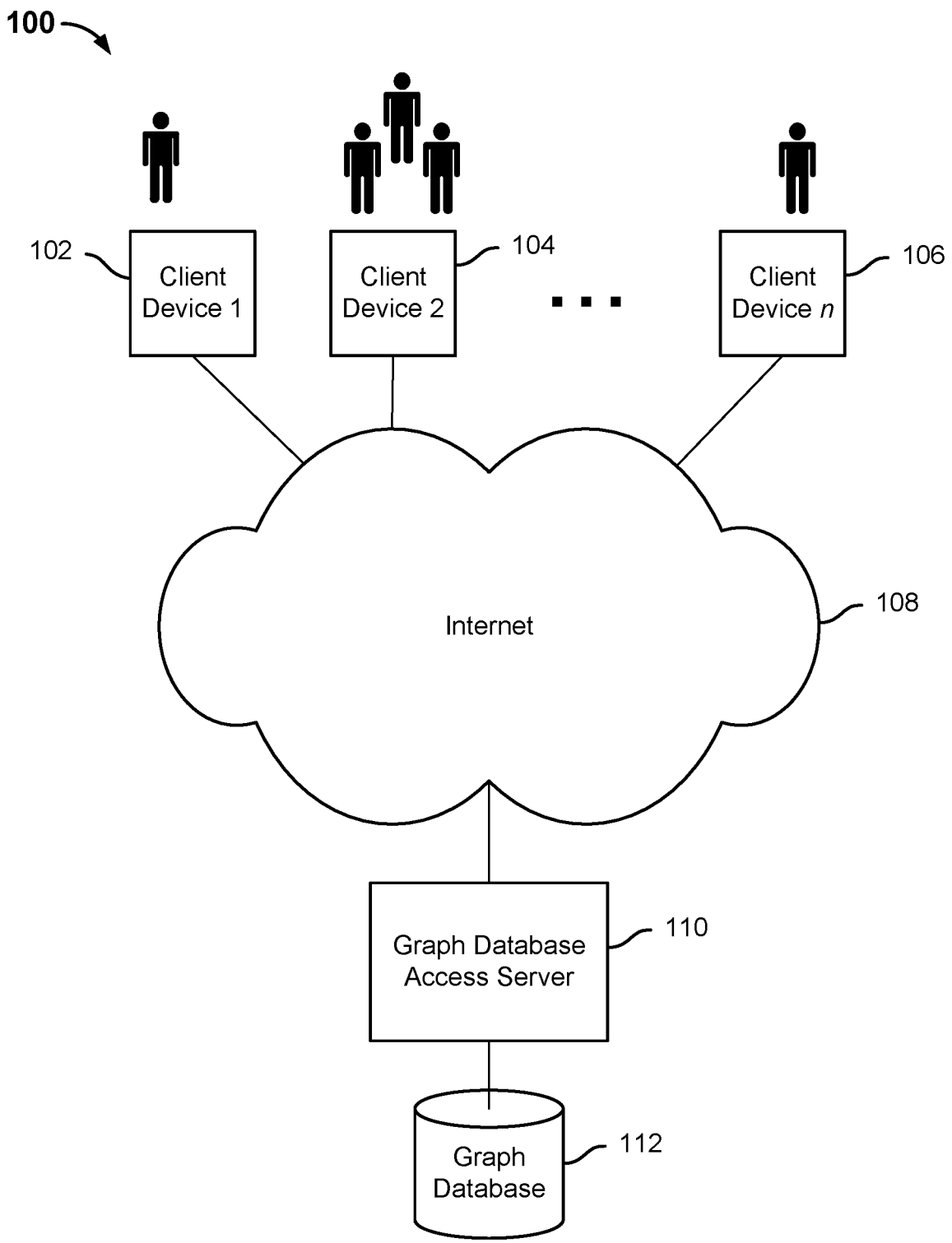
FIG. 1 is a block diagram illustrating an embodiment of a graph database system and environment.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Techniques are disclosed to provide correctness-preserving security for graph databases. In various embodiments, a security model is provided that enables administrators or other authorized users to grant (or deny) rights to traverse portions of a graph with respect to which the user may not have other rights, such as the right to see or read data or metadata associated with the nodes and/or edges (i.e., relationships between nodes) comprising the path or graph portion to which the right to traverse has been granted (or denied). In various embodiments, the right to traverse a portion of a graph to which the user does not have other access rights enables correctness to be preserved, without compromising security, by enabling a query pattern that spans across such a graph portion to be matched, and a relevant result to be provided in response to the query, without allowing the user to access data to which the user does not have access rights.

In various embodiments, a traverse permission is provided in addition to read and write permissions. The traverse permission allows a (suitably authorized) query to process nodes or relationships in a graph in order to extend the reach of the query. Nodes and relationships may not be visible to the user but may be traversable such that paths explored by the query are not unduly or incorrectly curtailed. In various embodiments, traversing does not reveal information about the nodes or relationships themselves to the end user, only permitting the query processing engine to proceed down a path, or not. As such, queries logically execute on the required input graph to solve the query, which would be typically impossible if only read and write permissions were available.

In various embodiments, use of techniques disclosed herein simultaneously preserves correctness and privacy (security). The administrator can permit or deny parts of the graph to be traversed without leaking information to the end user to preserve privacy. Correctness is preserved since traversals are permitted where they would otherwise be curtailed by blanket denying reads, which prevents partial or incorrect results being returned to the user.

FIG. 1 is a block diagram illustrating an embodiment of a graph database system and environment. In the example shown, graph database system and environment 100 includes a plurality of users, each associated with one or more client devices represented in FIG. 1 by client devices 102, 104, and 106. The client devices 102, 104, and 106 are connected via the Internet 108 (and/or one or more other networks) to graph database access server 110, which provides access to data stored in one or more graphs comprising graph database 112.

In the example shown, a client device, such as client device 104, may have multiple different users associated with the client device. In various embodiments, graph database access server 110 may be configured, as disclosed herein, to afford different access rights to different respective users, each according to the access rights granted and/or denied to that user, as disclosed herein.

In various embodiments, graph database access server 110 implements and enforces/provides a "traverse" right, as disclosed herein. In various embodiments, the traverse right enables a user to traverse an associated portion of a graph without (necessarily) having access to data associated with one or more nodes and/or relationships so traversed. In various embodiments, a user may only access or modify data with respect to which a read or write permission, respectively, has been granted and not denied, as disclosed herein.

Figure 2:
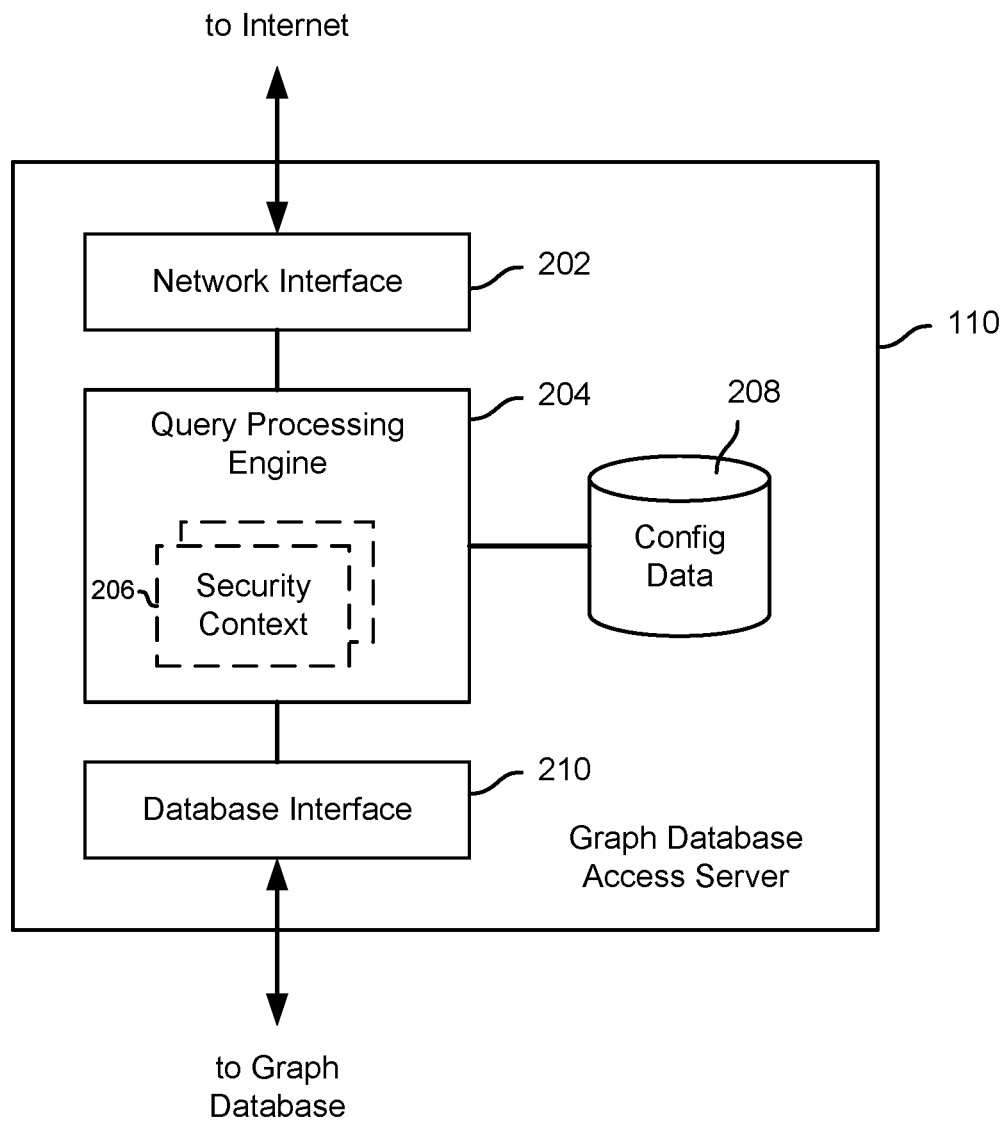
FIG. 2 is a block diagram illustrating an embodiment of a graph database access server.

FIG. 2 is a block diagram illustrating an embodiment of a graph database access server. In various embodiments, the graph database access server of FIG. 2 is used to implement the graph database access server 110 of FIG. 1. In the example shown, graph database access server 110 includes a network interface 202, such as a network interface card (NIC) and associated software entities, configured to communicate via the Internet and/or one or more other networks with client devices and/or other devices and systems, such as client devices 102, 104, and 106 of FIG. 1. For example, the graph database access server 110 may be configured to receive via network interface 202 database queries submitted via client devices such as client devices 102, 104, and 106 of FIG. 1.

In the example shown, graph database access server 110 further include a query processing engine 204 configured to process queries received via network interface 202. Each query is processed in a manner determined at least in part by an associated security context 206. In various embodiments, configuration data 208 associated with a user is used to create an instance of security context 206 associated with that user. For example, configuration data 208 may include a text or other configuration file that defines access rights to be afforded to a given user or set of users (e.g., by group, region, role or other affiliation or attribute). The query processing engine 204 parses the configuration data 208 to create and enforce the security context 206. In various embodiments, the security context 206 may include and implement the "traverse" right or permission, as disclosed herein.

The graph database access server 110 in the example shown in FIG. 2 further includes a database interface 210 via which the graph database access server 110 communicates with one or more graph databases, such as graph database 112 of FIG. 1.

In various embodiments, query processing engine 204 includes a number of processing modules to parse a received query; generate a plan to perform the query; execute the plan, including by obtaining a stream of potentially responsive data from the graph database; and generate and return a response to the query that is complete/correct (reflects results from all parts of the graph to which "traverse" permission is available) and secure (does not include data to which a user associated with the query has not been granted access).

In various embodiments, for each query, query processing engine 204 uses an associated security context 206 to ensure a correct and secure response is generated. Query processing engine 204 may use the security context 206 to determine which portions of the graph to access (e.g., traverse) to locate paths that match query patterns and/or may use the security context 206 to filter results to ensure access is not provided to data to which the requesting user has not been granted (or has been explicitly denied) access.

The use and effect of the "traverse" right, as implemented in various embodiments, will now be explained with reference to an illustrative example.

Figure 3A:
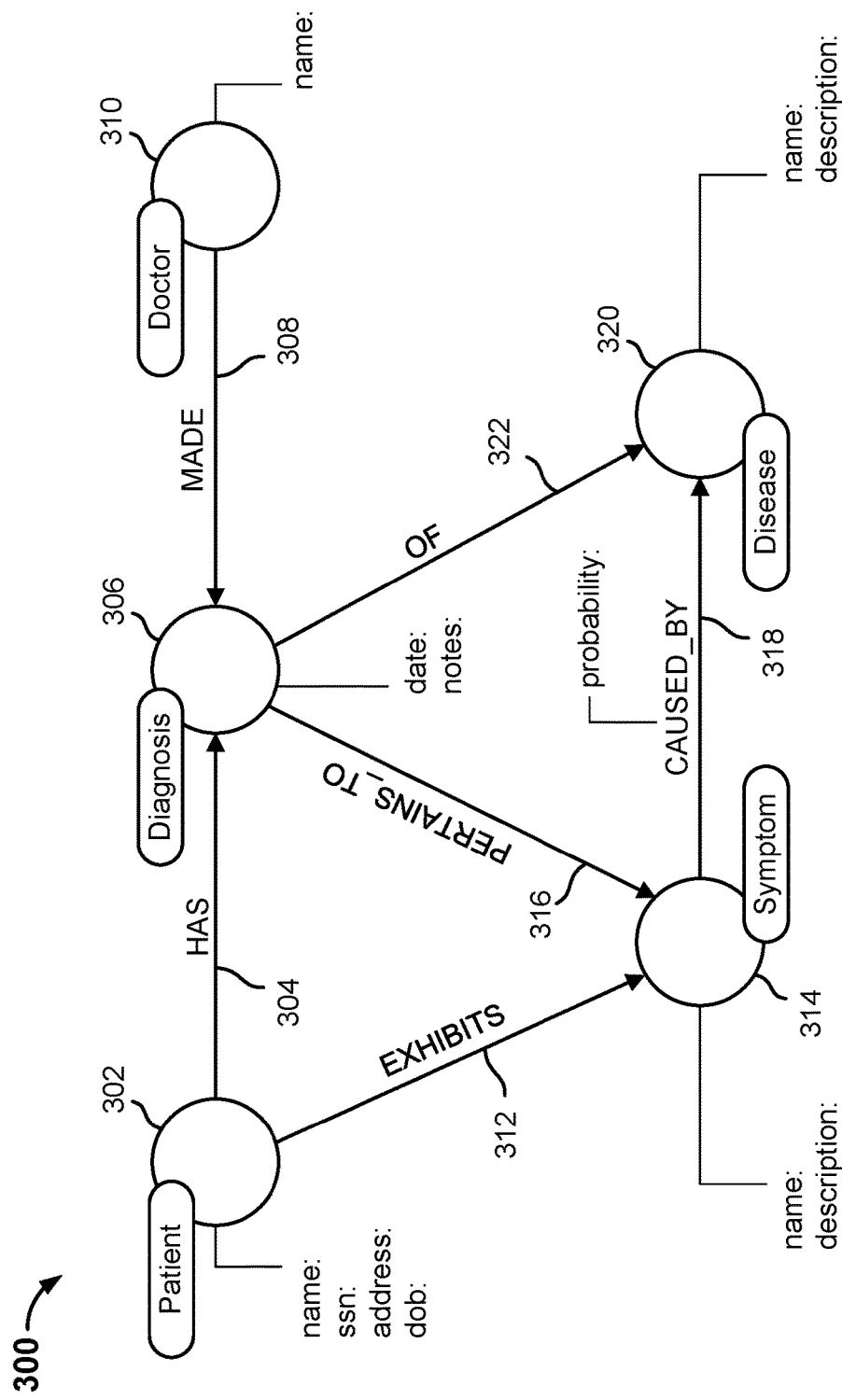
FIG. 3A is a diagram illustrating an example of correctness-preserving security in an embodiment of a graph database system.

FIG. 3A is a diagram illustrating an example of correctness-preserving security in an embodiment of a graph database system. In various embodiments, controlled access may be provided to authorized portions of a graph database having the graph model 300 of FIG. 3A, e.g., via a graph database access server such as graph database access server 110 of FIGS. 1 and 2.

In the example shown, graph 300 illustrates a (rudimentary) healthcare graph database for a medical clinic. The database contains five node labels, representing five roles within the clinic: Patient, Doctor, Diagnosis, Symptom, and Disease, labeled 302, 310, 306, 314, and 320, respectively, in FIG. 3A. The database contains six relationship types that characterize the interactions of the roles, which are: HAS, EXHIBITS, PERTAINS_TO, CAUSED_BY, OF, and MADE, labeled 304, 312, 316, 318, 322, and 308, respectively, in FIG. 3A.

Nodes with the (:Patient) label 302 represent patients that visit the clinic because they have some symptoms. Information specific to the patient has the following properties: name, ssn (social security number), address, and dob (date of birth).

Nodes with the (:Doctor) label 310 represent doctors in the clinic. Information specific to doctors includes only their names for the purposes of the invention description, and so those nodes carry the following property: name.

Nodes with the (:Diagnosis) label 306 represent a specific intervention by a doctor on behalf of a patient where a diagnosis has been established based on the evidence available. The diagnosis is a specific point in time on the patient's clinical journey and so it is dated along with other clinical notes the doctor makes. As such these nodes carry the following properties: date and notes.

Nodes with the (:Symptom) label 314 represent a symptom which sufferers of a disease might exhibit. The medical database contains a catalog of known symptoms linked to their related diseases. Symptoms contain the following properties: name and description.

Nodes with the (:Disease) label 320 represent a known disease in the database. The medical database contains a catalog of known diseases linked to their associated symptoms. Diseases have the following properties: name and description.

Each of the Patient, Doctor, Diagnosis, Symptom, and Disease nodes is connected via one or more relationships to form a graph. In the property graph model 300, the relationships have a type and direction. For example, a patient who has a symptom is represented as a path like (:Patient)-[:HAS]→(:Diagnosis)←[:MADE]-(:Doctor), which reads "patient has diagnosis, diagnosis made by doctor".

The HAS relationship 304 links patients to a diagnosis. There are typically many of these per patient. It carries no additional property data.

The EXHIBITS relationship 312 links patients to a symptom. There are typically many of these per patient. It carries no additional property data.

The PERTAINS_TO relationship 316 links a diagnosis to a symptom. There are typically many of these per diagnosis. It carries no additional property data.

The OF relationship 322 links a diagnosis to a disease. There is one of these per diagnosis. It carries no additional property data.

The MADE relationship 308 links a doctor to a diagnosis. There is typically one of these per diagnosis. It carries no additional property data.

The CAUSED_BY relationship 318 links a symptom to a disease. It also carries a property: probability. This property is an empirically established value which shows how strongly a disease is likely to express a particular symptom.

When a patient reports to the clinic, they describe their symptoms to the doctor. The doctor will then enter this information into the database, creating connections between the patient node and a graph of known symptoms. Properties of interest on this relationship would be the date when the symptom was reported, and a probability of a given symptom being present for the associated disease. The relationship forms a path between symptoms and diseases like:

(:Symptom)-[:CAUSED_BY {probability}]→(:Disease)

The doctor can use the graph of diseases and their symptoms to perform an initial investigation into the most likely diseases to match the patient. Based on this, and their own assessment of the patient, they may make a diagnosis which they would persist to the graph through the addition of this relationship with associated properties, forming a path such as:

(:Patient {name})-[:HAS]→(:Diagnosis {date, notes})←[:MADE]-(:Doctor {name}).

To illustrate correctness-preserving security for a graph database as implemented in various embodiments, assume the system has two roles: doctor and receptionist who can operate the clinic's graph database. Users in the doctor role should be able to read and write almost the whole graph. Users in the receptionist role should be able to read and write patient data, and importantly for the invention be able to connect a patient to a doctor, but not be able to see details of the symptoms, diseases or diagnoses.

Figure 3B:
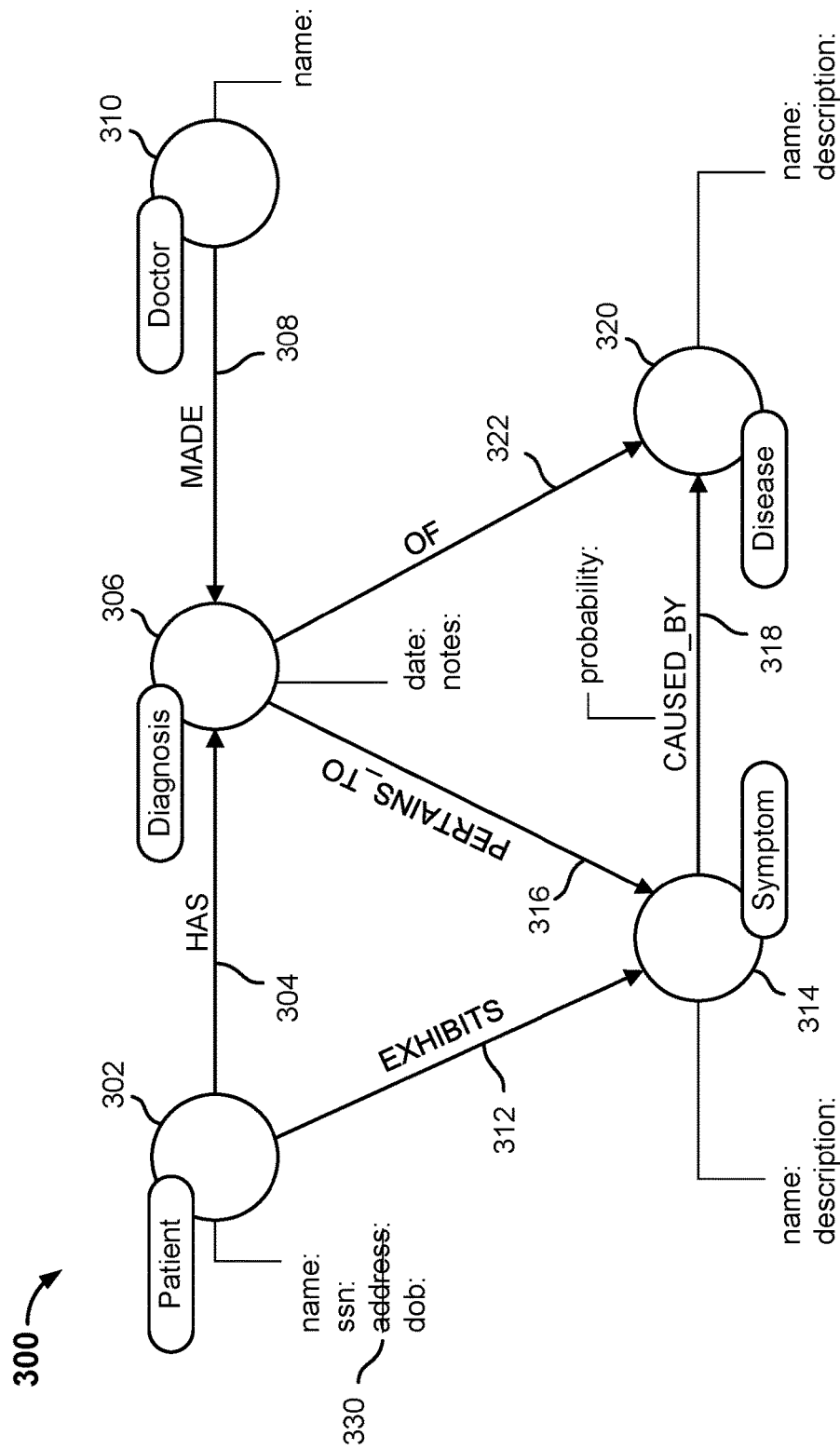
FIG. 3B is a diagram illustrating an example of correctness-preserving security in an embodiment of a graph database system.

FIG. 3B is a diagram illustrating an example of correctness-preserving security in an embodiment of a graph database system. In the example shown, the following configuration has been implemented to establish permissions for the doctor role:

GRANT ACCESS ON DATABASE healthcare TO doctor;
GRANT TRAVERSE ON GRAPH healthcare TO doctor;
GRANT READ {*} ON GRAPH healthcare TO doctor;
GRANT WRITE ON GRAPH healthcare TO doctor;
DENY READ {address} ON GRAPH healthcare NODE Patient TO doctor;

Most of the configuration above is about read/write permissions and provides context for a realistic graph database management system.

The doctor's view of the graph is almost total, as shown in FIG. 3B, where only the patient's address is denied to users in the doctor role. Importantly however, users in the doctor role can traverse the whole graph unimpeded which is essential for their clinical duties. That is, the whole graph is reachable even if some of the information therein remains privileged.

Whole graph traversal is made explicit in the example configuration above. It declares that TRAVERSE permission is GRANTed to the role doctor on the healthcare graph 300. Since there are no further DENY elements to reduce the scope of the doctor role's access, it means users in the role doctor can traverse to any part of the graph.

Figure 3C:
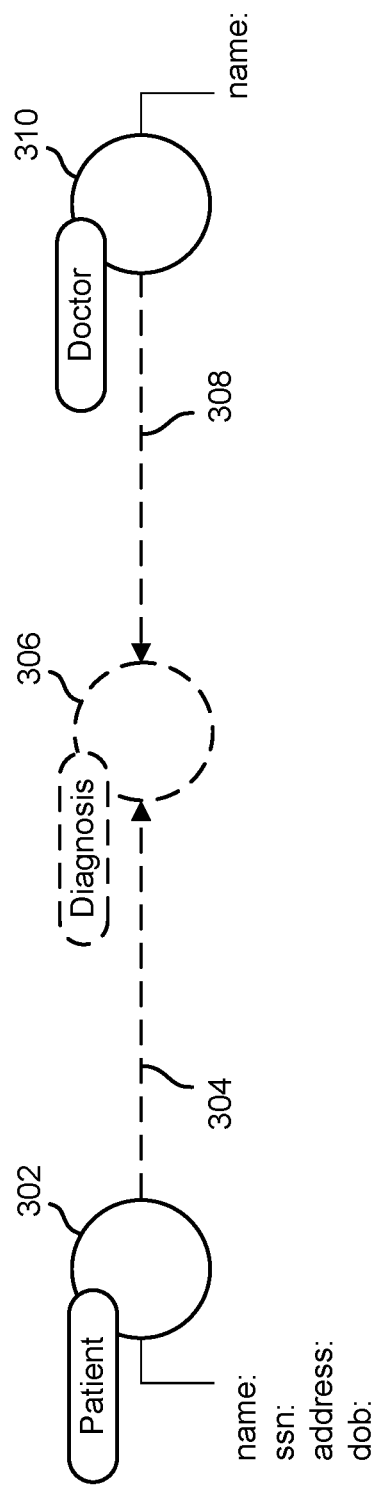
FIG. 3C is a diagram illustrating an example of correctness-preserving security in an embodiment of a graph database system.

FIG. 3C is a diagram illustrating an example of correctness-preserving security in an embodiment of a graph database system.

The configuration required to establish permissions for the receptionist role, in various embodiments, is the following:
GRANT ACCESS ON DATABASE healthcare TO receptionist;
GRANT READ {*} ON GRAPH healthcare NODES Patient TO receptionist;
GRANT READ {name} ON GRAPH healthcare NODES Doctor TO receptionist;
GRANT TRAVERSE ON GRAPH healthcare NODES Diagnosis, Doctor, Patient TO receptionist;
GRANT TRAVERSE ON GRAPH healthcare RELATIONSHIPS MADE, HAS TO receptionist;

The GRANT TRAVERSE parts of the above configuration have the effect that users operating the database in receptionist role are allowed to traverse across Diagnosis nodes and MADE and HAS relationships, as represented by the dashed lines for relationships 304, 308 and node 306. However, in this example, a receptionist would not be able to ask for Diagnosis nodes and MADE and HAS relationships (or any properties on those nodes or relationships) in their query. Any such read access is prohibited (because it has not been explicitly allowed in this example).

Users in the receptionist role are not allowed to traverse anywhere else, in this example, though they are allowed to read any property data they find in Patient nodes and the name property of any Doctor nodes in order to perform their duties.

As noted, the above configuration grants to users in the receptionist role permission to traverse Diagnosis nodes, as well as the MADE and HAS relationships that connect them. In various embodiments, the traverse permission allows the path between Patient and Doctor nodes to be traversed but not read or written. A significantly smaller portion of the graph is reachable by the receptionist user, as illustrated in FIG. 3C, resulting in a smaller graph to query (and a query performance boost from having less work to do).

In various embodiments, a distinction is made between node and relationship traversal. In some embodiments, a node which is denied traversal permission will not be considered for inclusion into a query even if it is connected by relationships that can be traversed. As such, relationships must have both appropriate permissions and be reachable via connected, permitted nodes in order to be processed in the query.

In the example illustrated by FIGS. 3A through 3C, for both the doctor and receptionist roles, correctness of queries has been preserved. In the doctor case, the whole graph is reachable and so queries run (almost) as if they were unsecured. For the receptionist case, the user is able to reach only parts the parts of the graph required to do their job.

Without traversal permissions, as disclosed herein, the receptionist user's permissions typically would be based on traditional read-write permissions which would, in the best case, require substantial additional data modelling or, in the typical case, lead to incorrect query responses as paths to otherwise necessary parts of the graph would be blocked.

In various embodiments, permissions are implemented in a conservative manner: DENY overrides GRANT where a node has multiple labels. For example if a user is has been granted permissions for label :A but denied permissions for label :B, and there is a node with both labels :A and :B then that node will not be traversed because :B is denied. This does not apply to relationships because in the property graph model, relationships have only one type.

Figure 4:
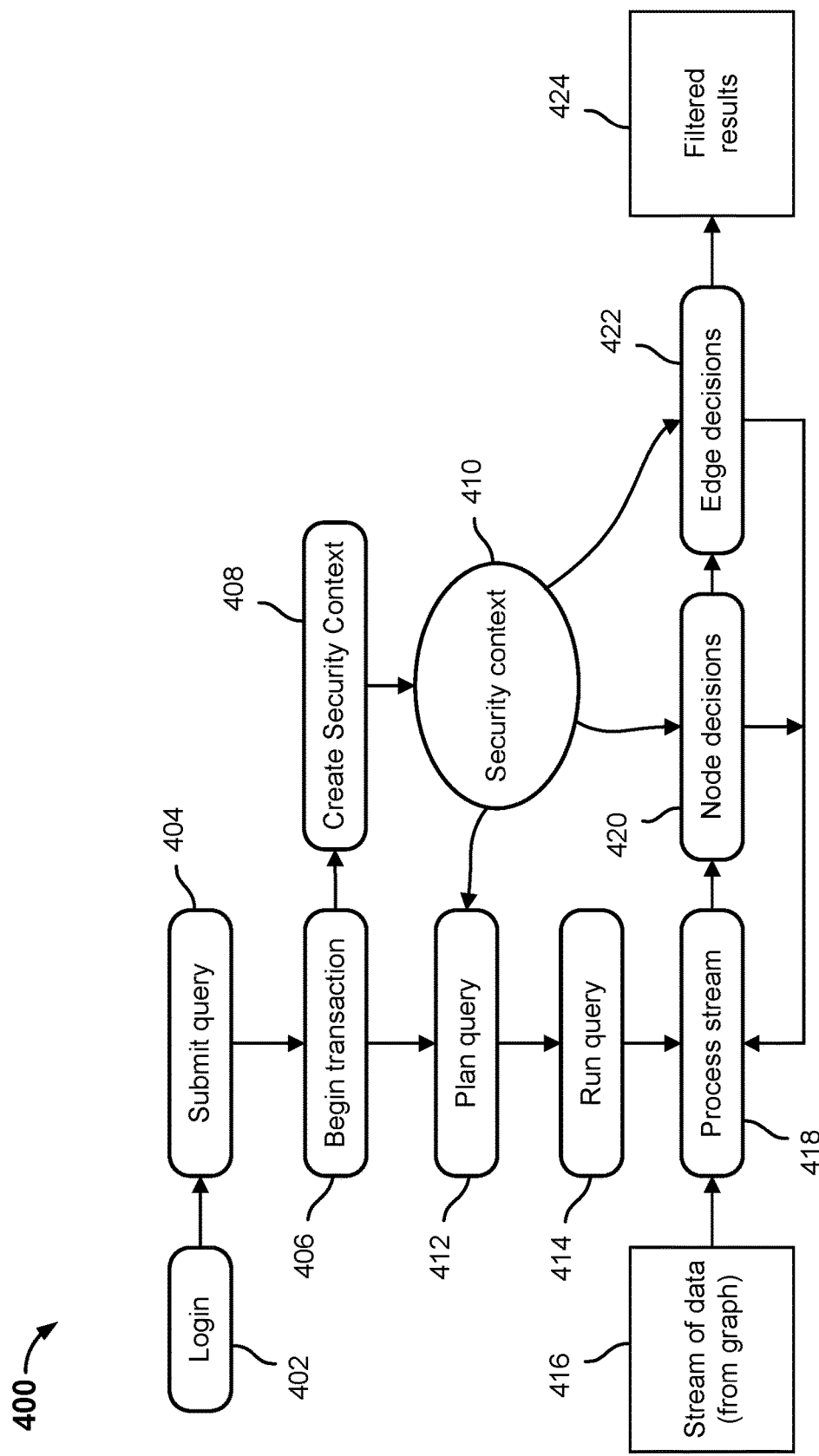
FIG. 4 is a flow diagram illustrating an embodiment of a process to provide correctness-preserving security in responding to a query to a graph database.

FIG. 4 is a flow diagram illustrating an embodiment of a process to provide correctness-preserving security in responding to a query to a graph database. FIG. 4 shows the top-level view of how a query is processed and executed by the graph database management system in various embodiments. In some embodiments, the process 400 of FIG. 4 is implemented by a graph database access server, such as graph database access server 110 of FIGS. 1 and 2.

In the example shown, at 402 a user logs in and provides user credentials. At 404 the user submits a query. A transaction to process the query begins at 406, prompting security context 410 to be created at 408. For example, the user credential provided at login 402 may be used to access security configuration data, which is parsed and used to establish security context 410. In various embodiments, security context 410 may include one or both of data structures to express the rights/permissions granted and/or denied to the user and one or more methods to enforce such permissions.

At 412, the query is planned and executed at 414. At 418, a stream of matching data 416 is retrieved from the underlying data store and filtered through logic 420, 422, which use the security context 410 to make decisions on which nodes and edges (relationships) will be presented in or discarded from the result set 424 for the user.

In the example shown, decisions by the node (420) and edge relationship (422) filtering logic may be fed back to inform further processing at 418 of data 416 received/obtained from the graph.

In various embodiments, the security context information from 410 also is injected into query planning in 412. This helps the planner to create query plans which pull less data from the store based on the security context. In turn this leads to improved efficiency and thus performance.

Once the query has been processed fully, the filtered results 424 are returned in response to the query.

Figure 5:
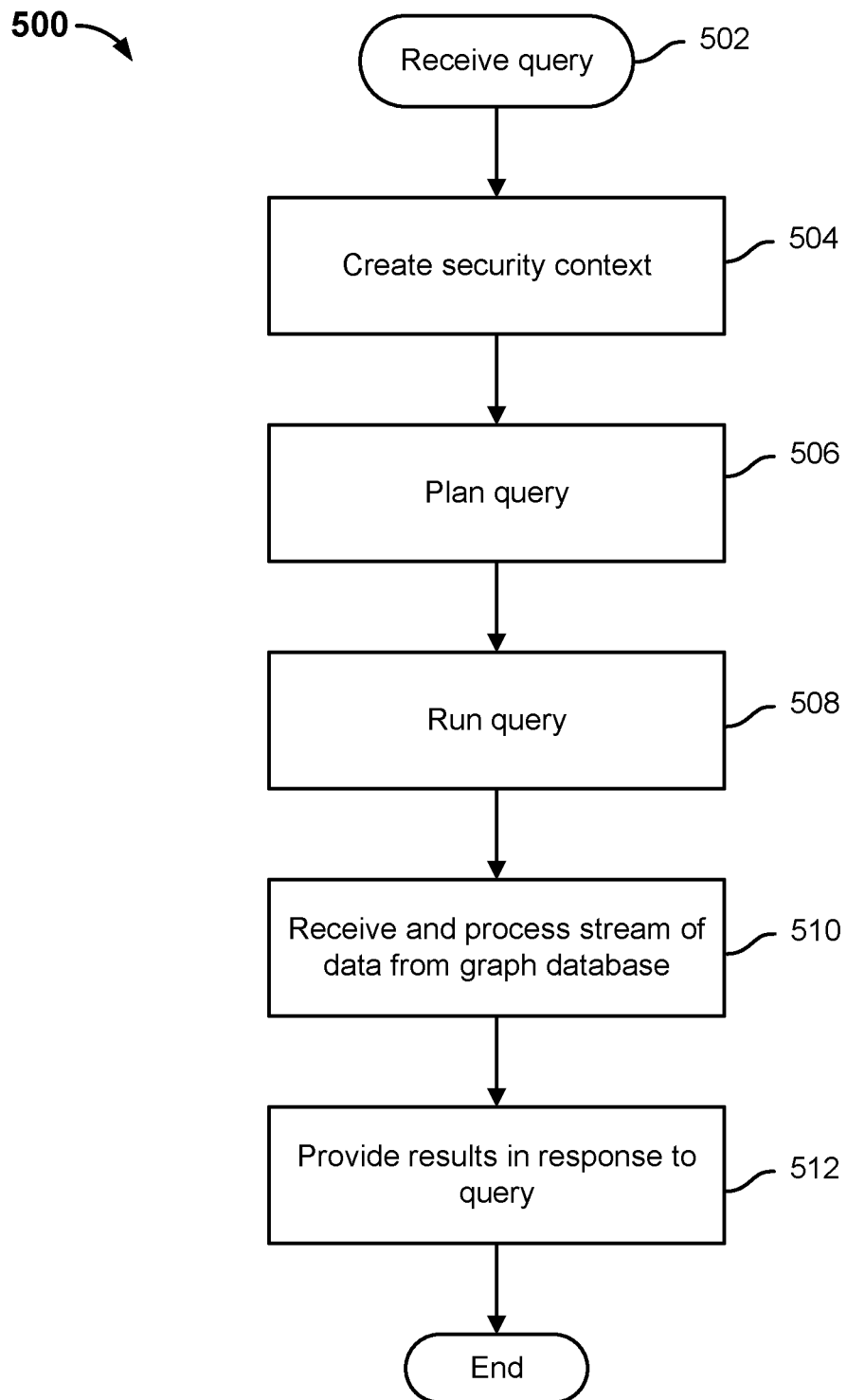
FIG. 5 is a flow diagram illustrating an embodiment of a process to provide correctness-preserving security in responding to a query to a graph database.

FIG. 5 is a flow diagram illustrating an embodiment of a process to provide correctness-preserving security in responding to a query to a graph database. In some embodiments, the process 500 of FIG. 5 is implemented by a graph database access server, such as graph database access server 110 of FIGS. 1 and 2. In the example shown, a query is received at 502. In response, a security context is created at 504. A plan to perform the query is made at 506 and run at 508. At 510, a stream of data is received from the graph database and processed according to the query. In various embodiments, the stream is processed in a manner determined at least in part by the security context created at 504. For example, in some embodiments only those portions of the graph to which a user with whom the query is associated has been granted at least traverse rights are explored. In some embodiments, portions of the graph to which the user has been granted traverse permission are explored, to the extent indicated by the query and/or plan, regardless of whether the user has other rights with respect to all or part of those portions, such as access to read nodes and/or relationships comprising those portions. At 512, results that are correct (not missing responsive data to which the user should have access) and secure (no data to which the user should not have access) are provided in response to the query.

Figure 6:
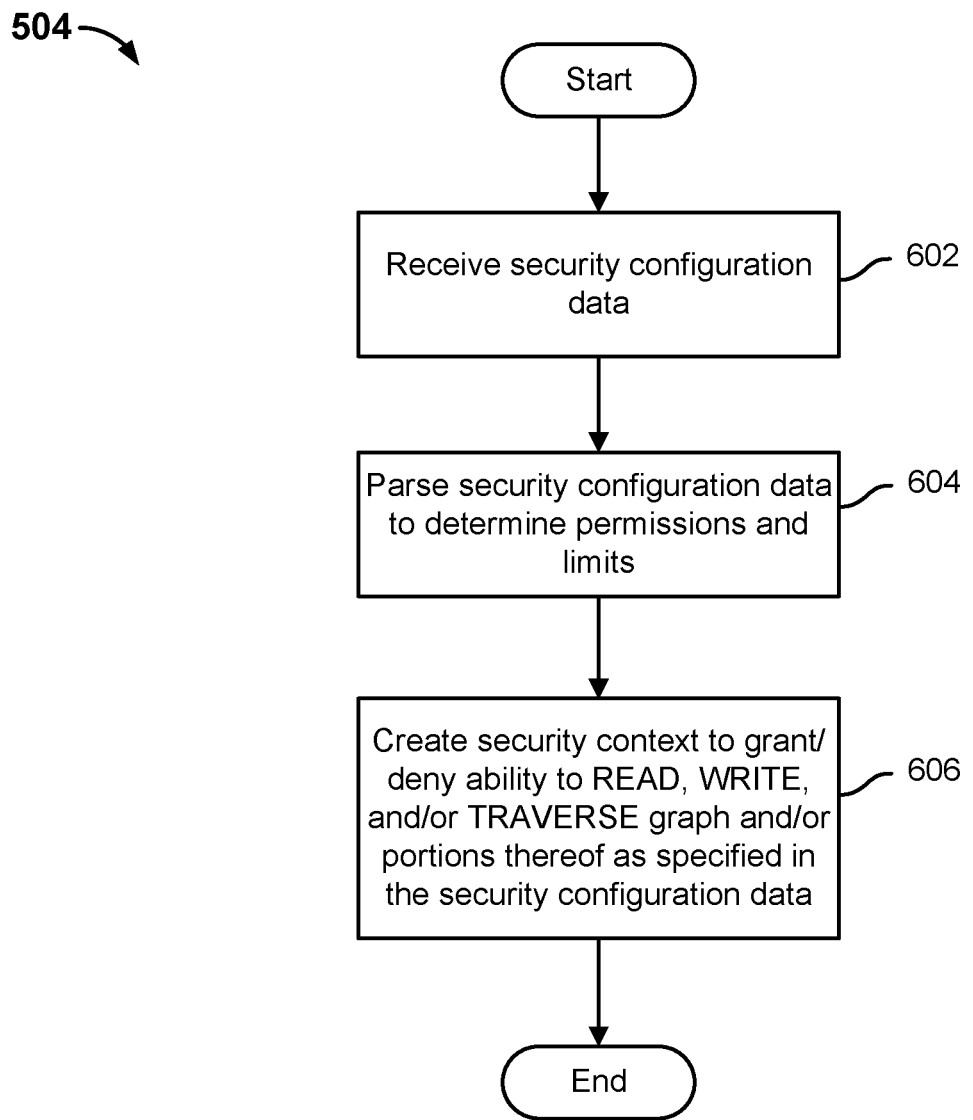
FIG. 6 is a flow diagram illustrating an embodiment of a process to create a security context to provide correctness-preserving security.

FIG. 6 is a flow diagram illustrating an embodiment of a process to create a security context to provide correctness-preserving security. In various embodiments, the process of FIG. 6 implements step 504 of the process 500 of FIG. 5. In the example shown, at 602 security configuration data is received. The security configuration data may include a file or portion thereof and may express the permissions granted and/or denied to a user, as in the examples above. At 604, the security configuration data is parsed to determine the permissions granted and denied to the user. At 606, a security context that reflects the permissions granted and/or denied to the user is created. For example, the security context created at 606 may comprise data structures configured to store values used by a query execution engine and/or framework to ensure correctness and security in responding to queries, as disclosed herein. In various embodiments, the security context is used to grant/deny the ability of the user to read, write, and/or traverse the graph and/or portions thereof as defined by the security configuration data.

Figure 7:
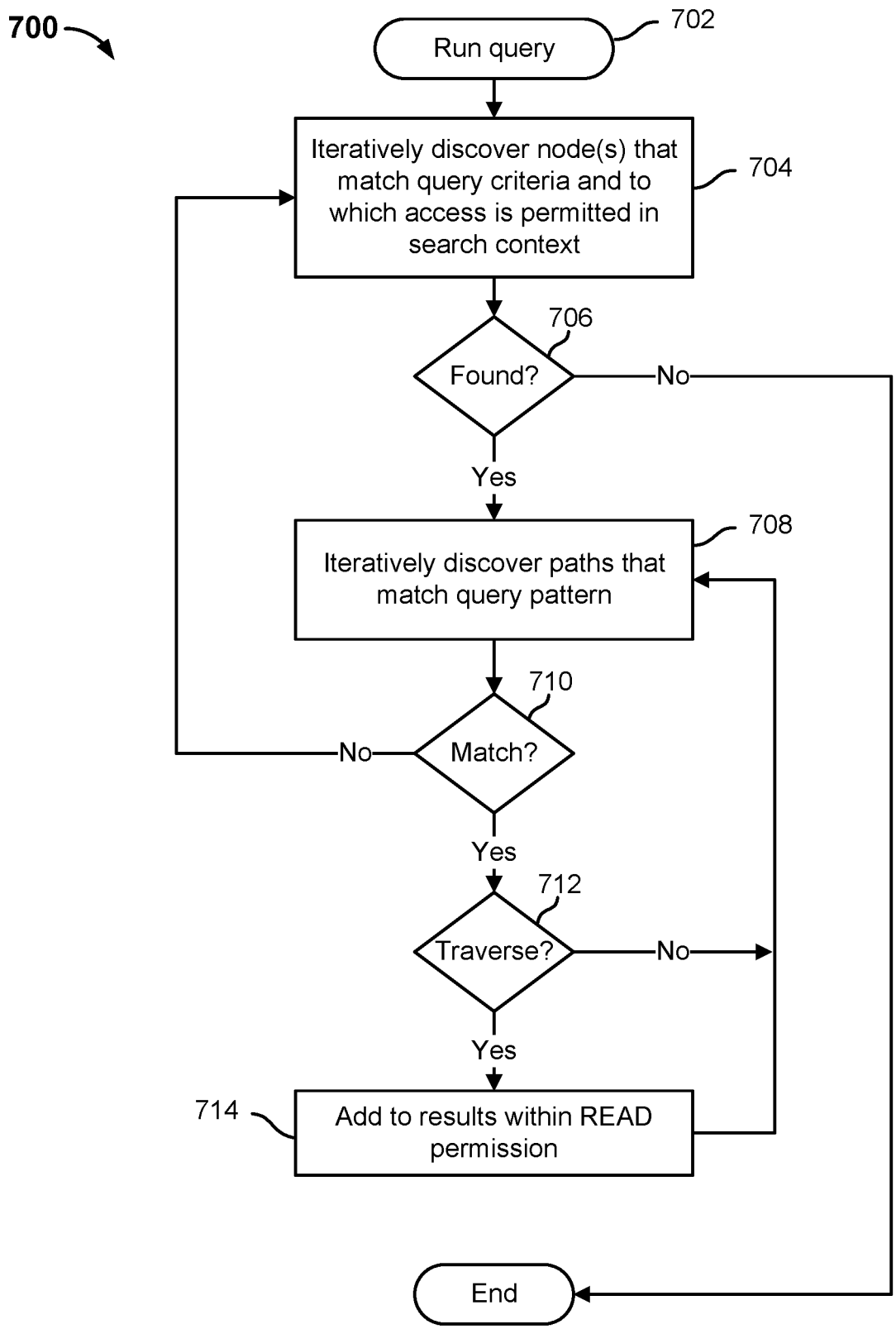
FIG. 7 is a flow diagram illustrating an embodiment of a process to respond to a query while providing correctness-preserving security.

FIG. 7 is a flow diagram illustrating an embodiment of a process to respond to a query while providing correctness-preserving security. In various embodiments, the process 500 of FIG. 5 is implemented by a graph database access server, such as graph database access server 110 of FIGS. 1 and 2. In the example shown, at 702 an indication to run an example query, e.g., according to a plan generated to run the query, is received. At 704, nodes that match query criteria and to which the user is allowed access are discovered, iteratively. At 706, for each node found at 704, the system iteratively discovers at 708 any path(s) that match a pattern associated with the query. For each path that matches (710), the system determines at 712 whether the user has the rights required to traverse the path and include in the results data responsive to the query. If so, the results are added at 714 to the results set. If not, the system continues to discover potentially responsive paths (708, 710) until no further paths are available to be discovered and evaluated. Once all potentially responsive paths for a given node have been processed, the system moves on to attempt to discover, at 704, at next node that matches a query criteria, and processing continues and above (706, 708, 710, 712, 714), and continues in the same manner until no further nodes exist that match the query criteria and to which the user has access rights, 706, at which point the process 700 ends.

The process of executing a query and determining the correctness-preserving result set is described below using a small graph as an example.

Figure 8:
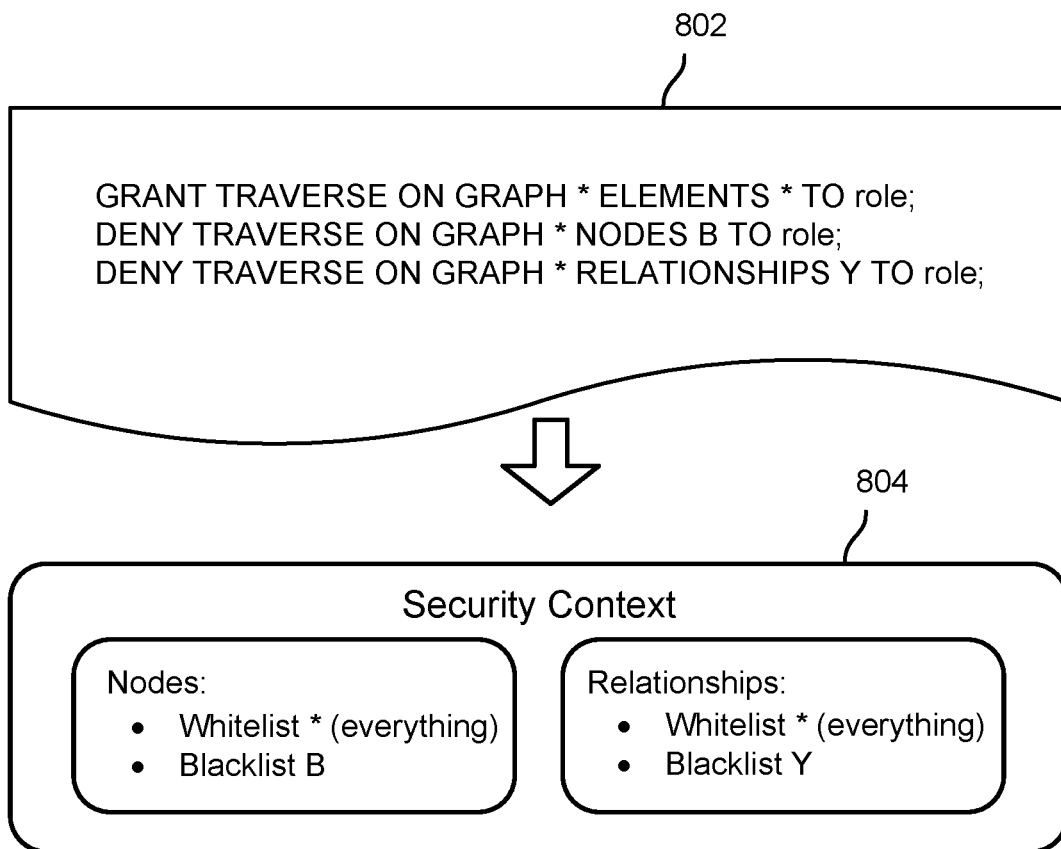
FIG. 8 is a diagram illustrating an example of a security context to provide correctness-preserving security in an embodiment of a graph database system.

FIG. 8 is a diagram illustrating an example of a security context to provide correctness-preserving security in an embodiment of a graph database system. In the example shown, the system uses an operator-supplied security configuration 802 to produce a programmatic security context 804. In this example, the "traverse" right is granted, in the first line of configuration data 802, to the entire graph. The second line of configuration data 802 denies the traverse right, however, with respect to nodes having the label "B", and the third line of configuration data 802 denies the traverse right to relationships of type "Y". The configuration data 802 is reflected in security context 804 in the form of a set of node permissions on the left ("whitelist" all nodes but then blacklist nodes labeled "B") and relationship permissions on the right (whitelist all but then blacklist relationships of type "Y").

Note that for clarity only the "traverse" rights in this simplified example are represented in FIG. 8, and other rights, such as "read" or "write", are ignored.

In various embodiments, generating programmatic security contexts (e.g., 804) from textual configuration data (e.g., 802) allows query traversals to be processed rapidly at runtime. Allowing the user to straightforwardly specify security rules based on the graph data encourages a secure mode of operation. Since operating on secured graphs typically involves processing less data, resource contention decreases and performance improves.

In various embodiments, the security context 804 generated from the configuration data 802 in FIG. 8 is bound to the query lifecycle bound to the current query of the graph database management system (since security is part of the context for execution), e.g., as shown and described above in connection with FIG. 4.

The security context 804 is applied in the example described below to illustrate the process of executing a query and determining the correctness-preserving result set, using a small graph as an example.

Figure 9A:
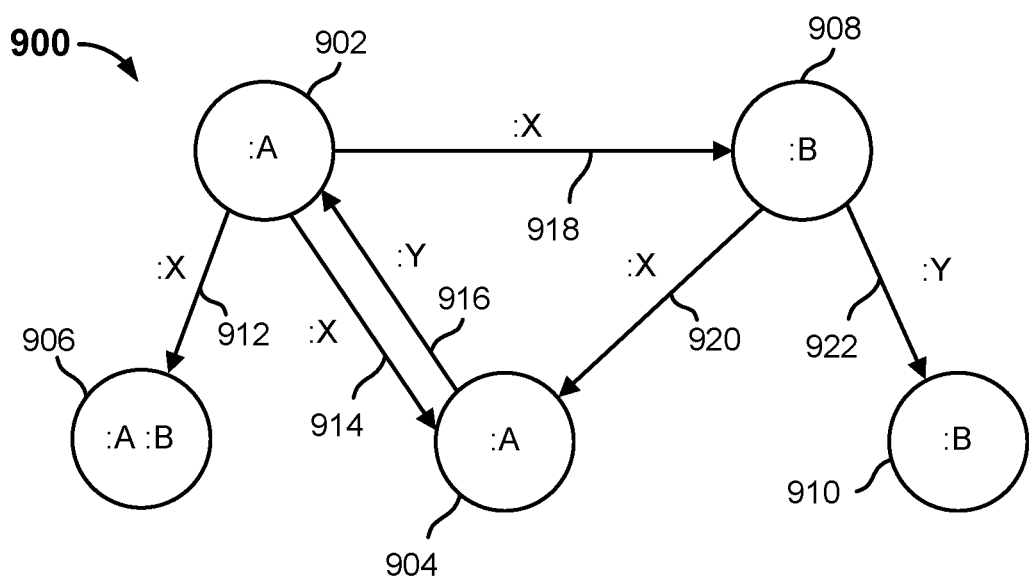
FIG. 9A is a diagram illustrating an example of correctness-preserving security in an embodiment of a graph database system.

FIG. 9A is a diagram illustrating an example of correctness-preserving security in an embodiment of a graph database system. In the example shown, graph 900 includes plurality of nodes (902, 904, 906, 908, and 910), each having a label "A", a label "B", or in the case of node 906 both label "A" and label "B". The nodes (902, 904, 906, 908, and 910) are connected by relationships (912, 914, 916, 918, 920, 922), each of type "X" or type "Y", as shown in FIG. 9A.

Figure 9B:
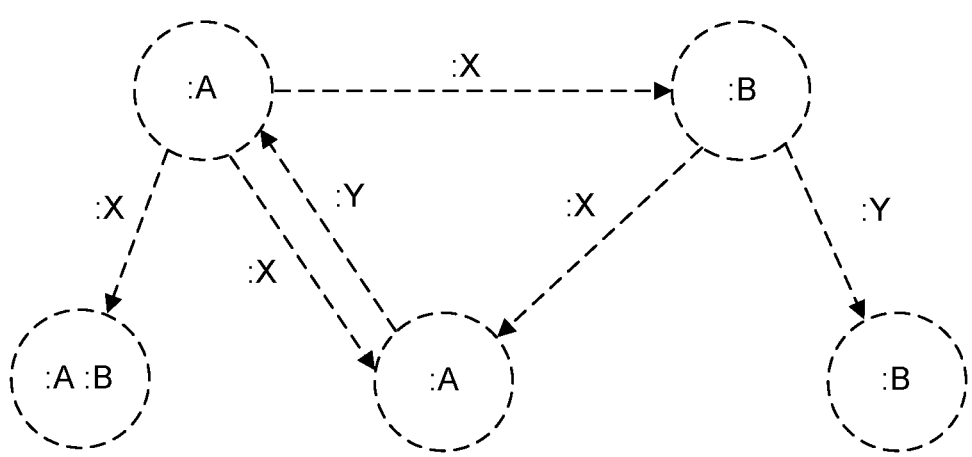
FIG. 9B is a diagram illustrating an example of correctness-preserving security in an embodiment of a graph database system.

FIG. 9B is a diagram illustrating an example of correctness-preserving security in an embodiment of a graph database system. As shown in FIG. 9B, graph 900 is represented in a manner associated with the starting point for execution of a query, in which no node or relationship has yet been discovered or explored in connection with a query and the results set has been initialized but remains empty.

For purposes of example, consider the query MATCH (n)→(m) RETURN n, m, which states that the database should find all nodes (n) with any labels or none and all outgoing relationships from those nodes with any type→and the terminating nodes for those relationships (m) which may have any labels or none. Note that in practice this is an expensive query for returning the whole graph (with duplicate results), but a simple query allows a straightforward description of the invention.

An example of a query execution plan to perform the above query is:
Find all (n) nodes, and for each node:
    Find all outgoing relationships, and for each relationship:
        Get end node (m)
        Add n and m to result table The example in FIG. 9B shows the full extent of the query over the (small) example graph 900. Note that at this point query execution has not started and so the results are empty.

Figure 9C:
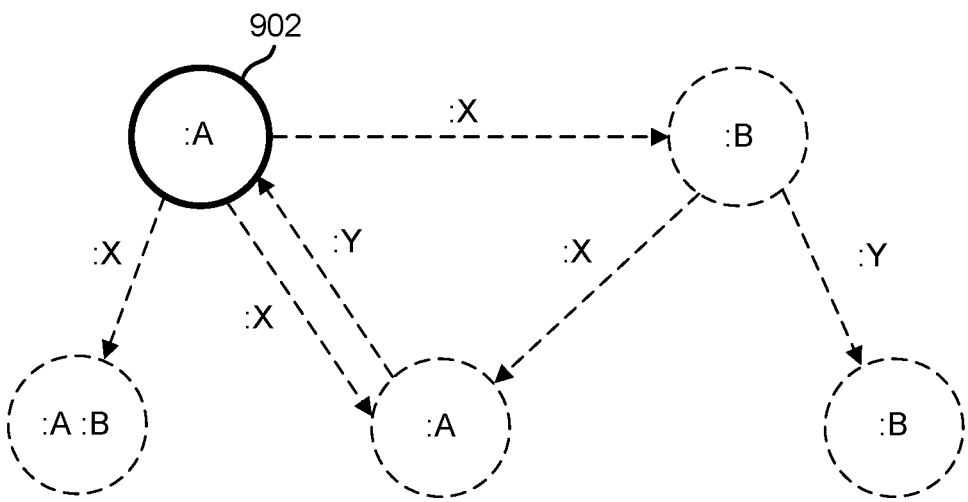
FIG. 9C is a diagram illustrating an example of correctness-preserving security in an embodiment of a graph database system.

FIG. 9C is a diagram illustrating an example of correctness-preserving security in an embodiment of a graph database system. Specifically, FIG. 9C illustrates the first step in the query, i.e., to find all nodes. A match for a node 902 with label :A is found and it is checked against the security context where it is determined that the node is valid for further traversal and the query executor potentially include outgoing relationships incident on that node.

Figure 9D:
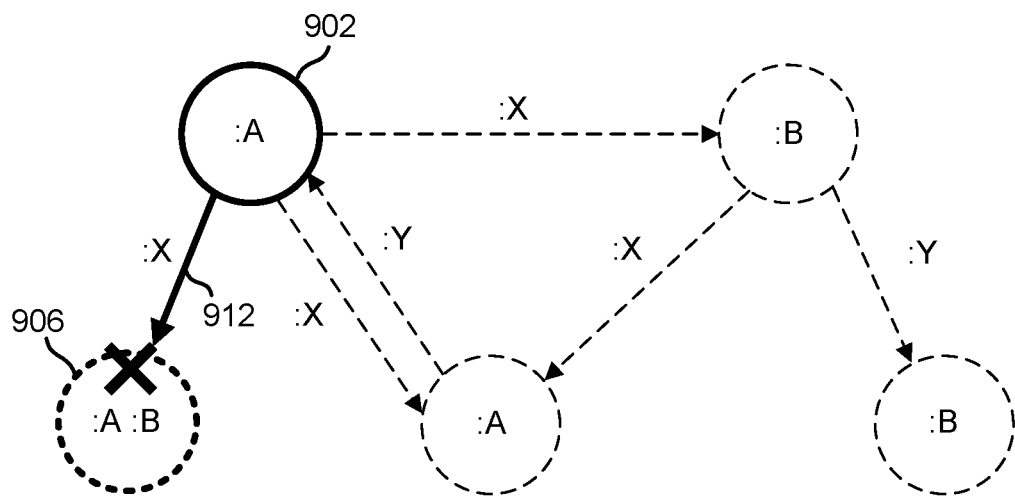
FIG. 9D is a diagram illustrating an example of correctness-preserving security in an embodiment of a graph database system.

FIG. 9D is a diagram illustrating an example of correctness-preserving security in an embodiment of a graph database system. As shown in FIG. 9D, having found the node 902 with label :A, and since the security context 804 of FIG.

8 allows traversal of that node, the query executor will begin work on the second part of the query, to discover relationships. As shown in FIG. 9D, the query executor in this example discovers an outbound relationship 912 of type :X which connects to a node 906 with the labels :A and :B. When the traversal permissions are evaluated against the security context 804, the result is that the relationship 912 of type :X is traversable, but that its end node 906 having a blacklisted :B label in the security context 804 is not. This prevents a match from occurring, and this path is not added to the results.

In this example, the blacklisted node 906 with :A and :B labels cannot be traversed. As a result, no further paths would be explored along this route, such as paths at a further depth beyond node 906.

Figure 9E:
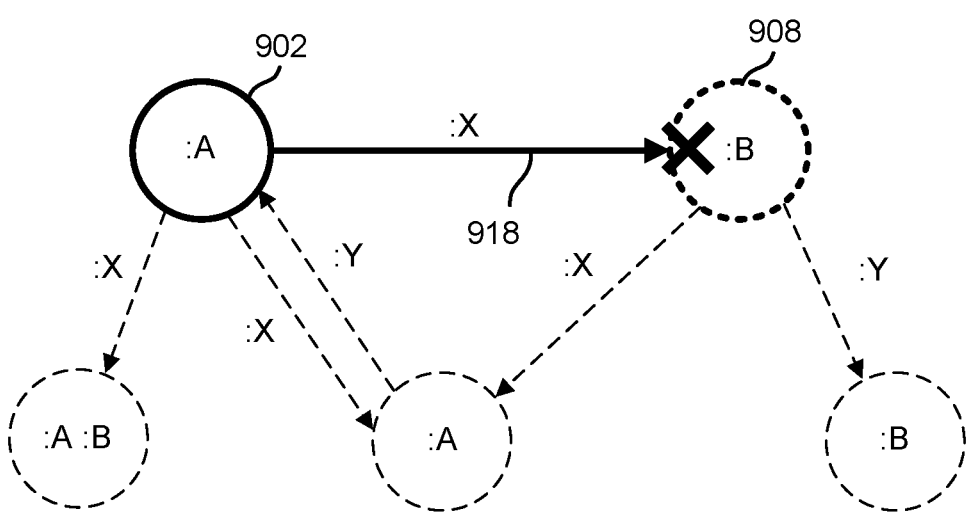
FIG. 9E is a diagram illustrating an example of correctness-preserving security in an embodiment of a graph database system.

FIG. 9E is a diagram illustrating an example of correctness-preserving security in an embodiment of a graph database system. In the example shown in FIG. 9E, the traversal of the path from node 902 (labeled :A) via relationship 918 (of type :X) to node 908 (labeled :B) is evaluated. When executed against the security context 804, the relationship 918 with type :X is acceptable because of its whitelist entry, but the terminating node 908 with the :B label has been blacklisted. This means no match is possible and no results are added for the user. As above, the traversal operation understands it cannot traverse past the node 908 labeled :B and so all other paths beyond that node are excluded.

Note that there may be other permissible paths through a graph that are longer than the example shown in FIG. 9D, which may allow the query executor to reach nodes at a higher traversal depth, assuming the path matches the query pattern (which is easy to see with variable length patterns like (a)-[r*]→(b)). This is proper and correct: the length of a path has no direct bearing on its traversal permissions.

Figure 9F:
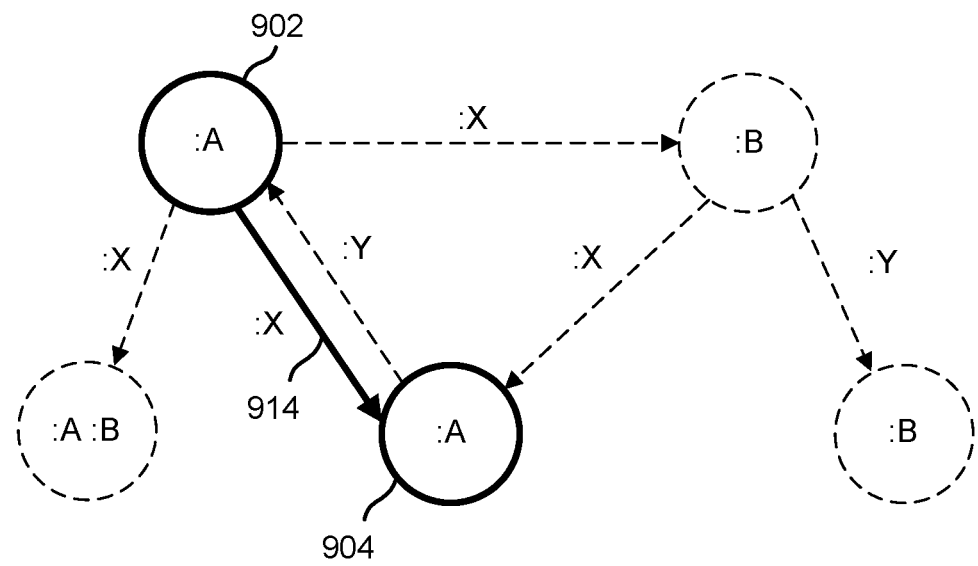
FIG. 9F is a diagram illustrating an example of correctness-preserving security in an embodiment of a graph database system.

FIG. 9F is a diagram illustrating an example of correctness-preserving security in an embodiment of a graph database system. As shown in FIG. 9F, the query executor discovers a successfully matched path with traversable node labels and relationship types, within the bounds of the current security context. Specifically, the traversal execution evaluates the path from node 902 (labeled :A) via relationship 914 (of type :X) to node 904 (labeled :A). In this case the relationship type and node label are both whitelisted allowing progress to continue along this path. The query executor finds a complete match for the query pattern that is legal within the current security context, resulting in the matched path being added to the results for the user before continuing.

Figure 9G:
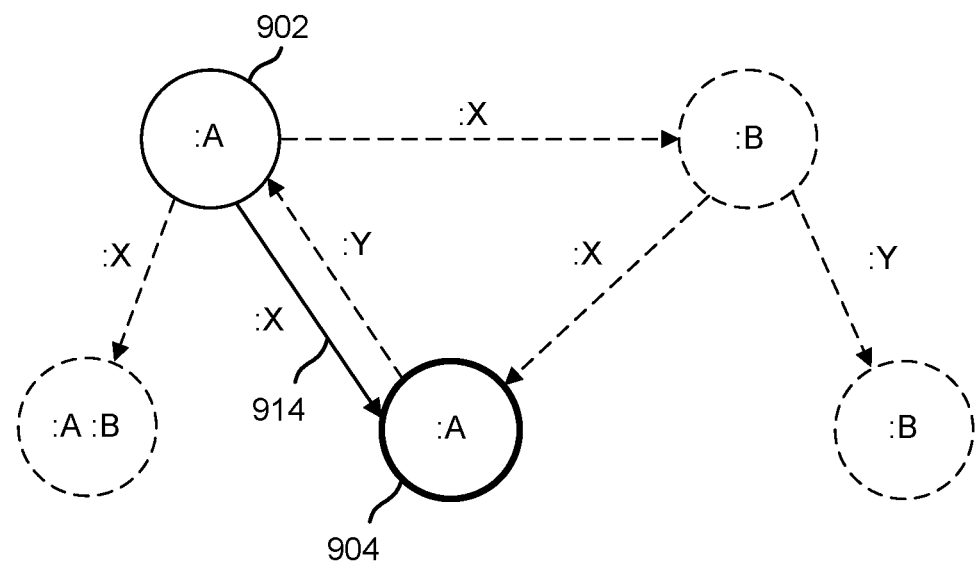
FIG. 9G is a diagram illustrating an example of correctness-preserving security in an embodiment of a graph database system.

FIG. 9G is a diagram illustrating an example of correctness-preserving security in an embodiment of a graph database system. In the state shown in FIG. 9G, a next iteration of query execution according to the query plan presented above is performed, going back to the first part of the query MATCH (n)→(m) as shown. While a node labeled :A can be matched, the invention fails to match a permitted outgoing relationship (since :Y is excluded) and no further additions are made to the result set. As shown, the query executor repeats the secure traversal algorithm from the next matching start node, in this example the node 904 that was discovered in connection with the graph traversal that resulted in the node 902-node 904 pair being added to the results set.

Figure 9H:
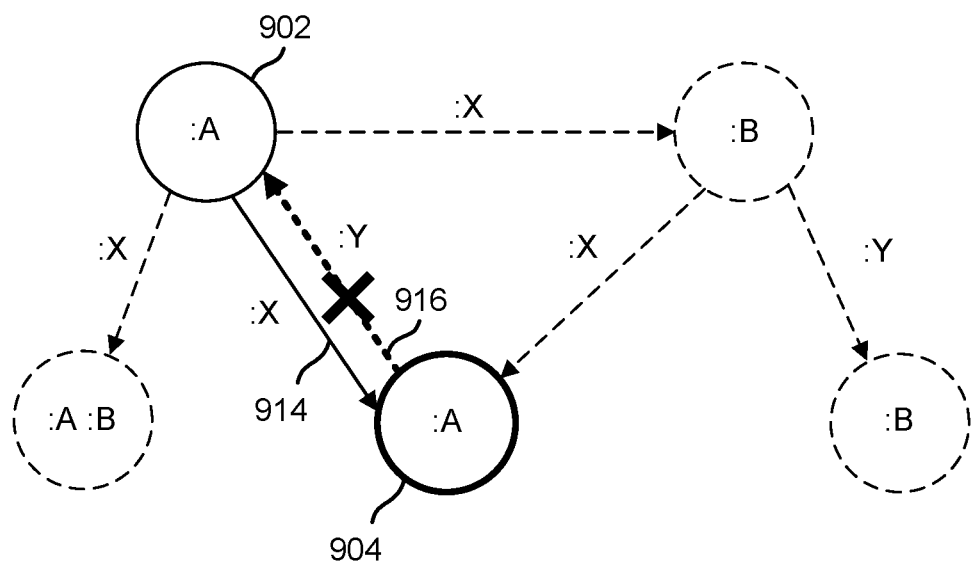
FIG. 9H is a diagram illustrating an example of correctness-preserving security in an embodiment of a graph database system.

FIG. 9H is a diagram illustrating an example of correctness-preserving security in an embodiment of a graph database system. As illustrated, in this example the query executor's traversal finds no further reachable paths from current node 904 owing to relationship type, direction, or security context blacklisting. Specifically, the traversal operation processes all outbound relationships from node 904 finding only a blacklisted relationship 916 with type :Y as shown.

Figure 9I:
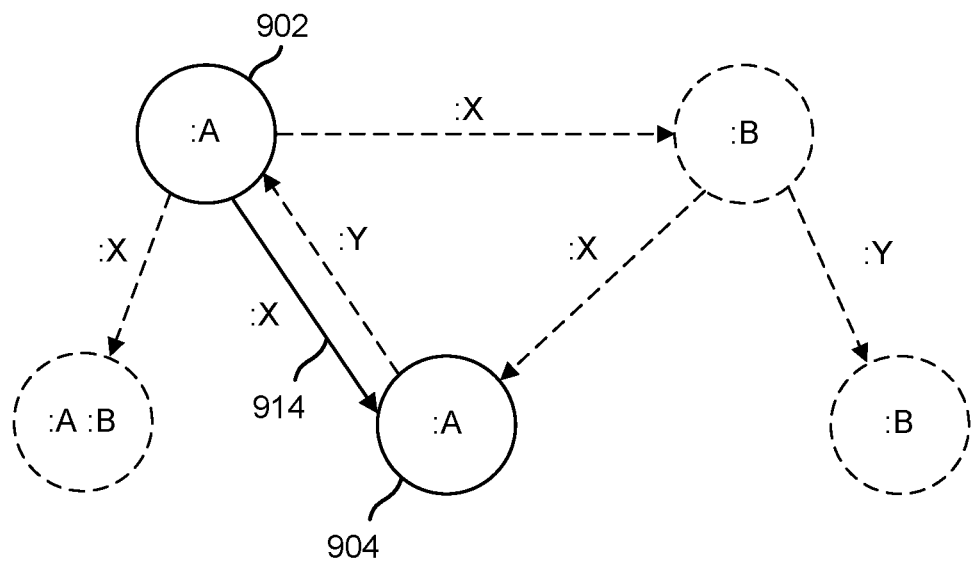
FIG. 9I is a diagram illustrating an example of correctness-preserving security in an embodiment of a graph database system.

FIG. 9I is a diagram illustrating an example of correctness-preserving security in an embodiment of a graph database system. In the state shown in FIG. 9I, the system has determined that the traversal operation has finished. All whitelisted nodes 902, 904 with label :A (and not also blacklisted label :B) have been evaluated and all their outgoing relationships have been evaluated. There are only blacklisted nodes left (i.e., include label :B) which will not be matched given current security context 804.

There are no further matching reachable paths from the node 904 labeled :A and the remainder of the graph has already been shown to be unreachable. The system has completed its task and the collected results can be sent back to the user knowing that only information that the user that submitted the query is explicitly permitted to see will be transmitted. No other information has leaked. The query executor completes the traversal and returns results to the user. The results, in this example the single node pair {node 902, node 904}, include all results that should be included and no data to which access should not have been permitted according to the security context 804.

Figure 10A:
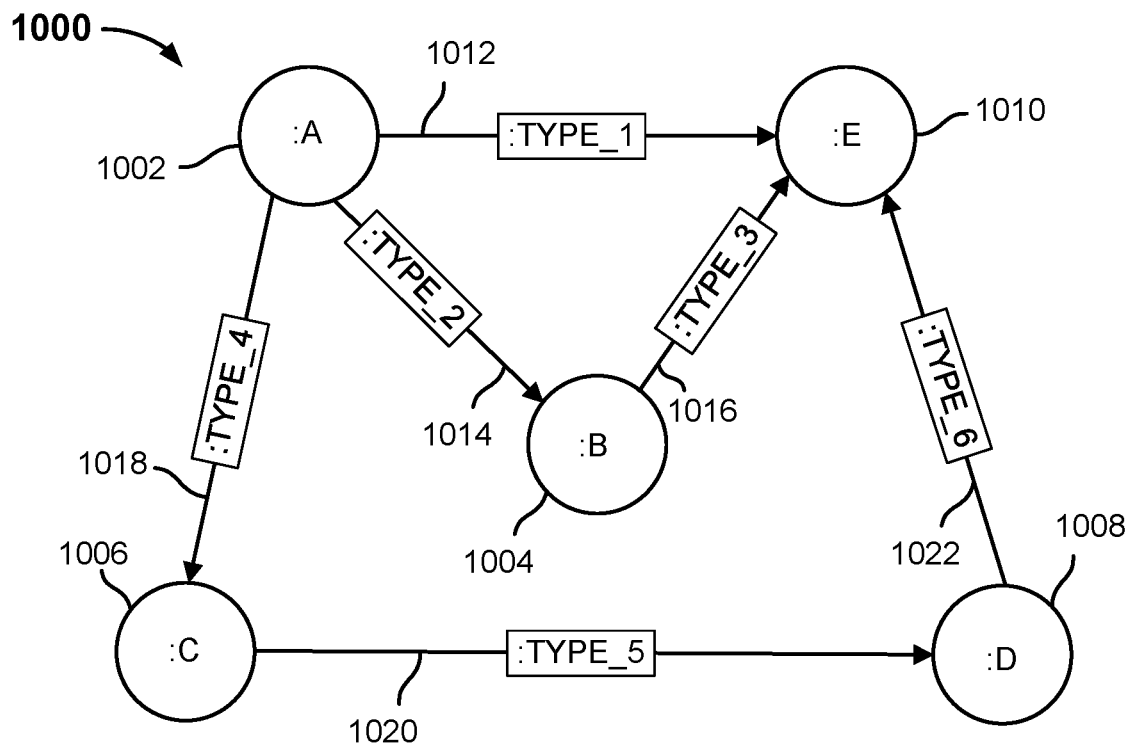
FIG. 10A is a diagram illustrating an example of correctness-preserving security in an embodiment of a graph database system.

FIG. 10A is a diagram illustrating an example of correctness-preserving security in an embodiment of a graph database system. In the example shown, graph 1000 includes a plurality of nodes (1002, 1004, 1006, 1008, and 1010), labeled "A" through "E", respectively. The nodes (1002, 1004, 1006, 1008, and 1010) are connected by relationships (1012, 1014, 1016, 1018, 1020, 1022), of types "TYPE_1" through "TYPE_6", inclusive and respectively, as shown in FIG. 10A.

Figure 10B:
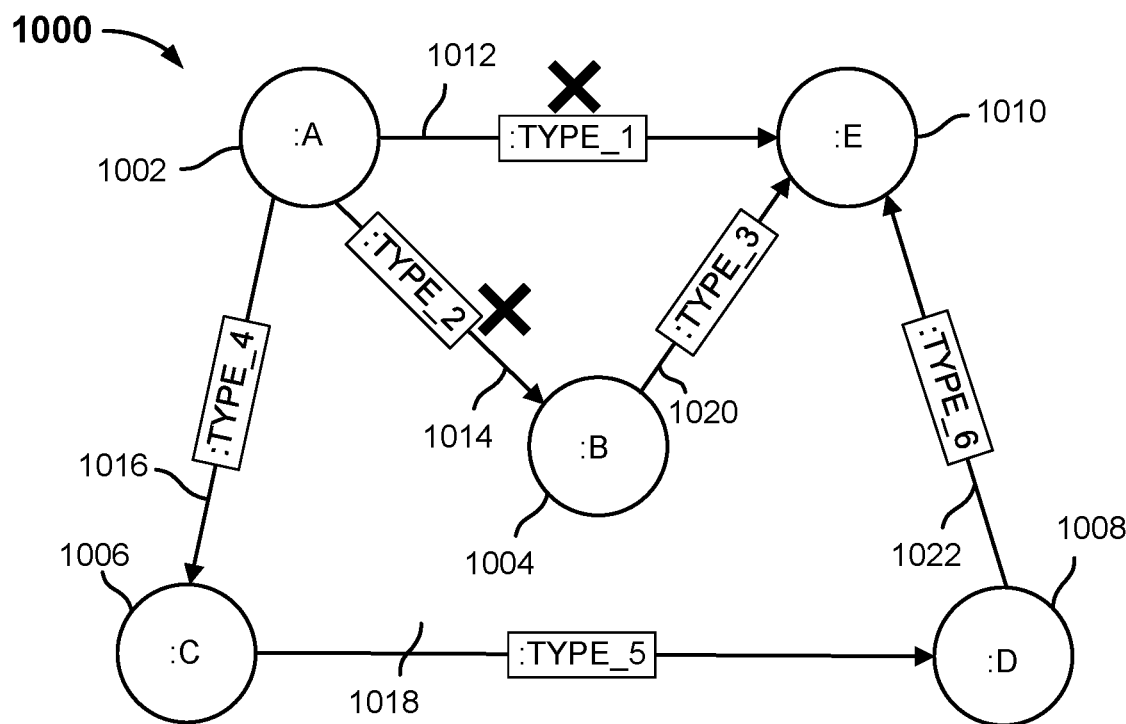
FIG. 10B is a diagram illustrating an example of correctness-preserving security in an embodiment of a graph database system.

Consider an example in which the following rights in the graph 1000, denominated "example", have been granted to a user "user" using the MATCH permission which is a combination of TRAVERSE and READ:
GRANT MATCH {*} ON GRAPH example TO user;
DENY TRAVERSE ON GRAPH example RELATIONSHIP TYPE_1 TO user;
DENY TRAVERSE ON GRAPH example RELATIONSHIP TYPE_2 TO user;

FIG. 10B is a diagram illustrating an example of correctness-preserving security in an embodiment of a graph database system. In the example shown, graph 1000 as shown in FIG. 10A has been annotated to reflect the above access rights, specifically the denial of the right to traverse relationships of the types TYPE_1 or TYPE_2, as indicated by the large black "X" adjacent to the relationships 1012 and 1014 as shown in FIG. 10B.

As a result of the permissions as defined above and illustrated in FIG. 10B, a response to the following query such as the one described above in connection with FIGS. 9A through 9i, e.g., MATCH (s)-[r]→(d), where s is a source node, r denotes any relationship, and d denotes a destination node, would return the following node pairs: A-C, B-E, C-D, and D-E; but not the pairs associated with relationships of TYPE_1 or TYPE_2, i.e., not the pairs A-B or A-E.

By comparison, a query that sought the shortest path between two nodes would return a result for any node pair connected by at least one path the edges of which the requesting user has the right to traverse. For example, the following query seeking the shortest path between the nodes labeled A and E (1002, 1010):MATCH (s:A), (d:E), p=shortestPath ((s)-[*]→(d)) RETURN p; would return the path from node A (1002) to node E (1010) via the nodes C (1006) and D (1008) via relationships 1018, 1020, and 1022, representing the shortest path between nodes A and E given the denial of traverse rights with respect to the relationships 1012 and 1014 which are component segments of shorter paths that exist from node A to E. In this example, node A remains reachable from node E by a user with permissions as defined above and illustrated in FIG. 10B. A complete and accurate result is returned without allowing access to any portion of the graph 1000 to which the user did not have access rights.

For a further example, consider the medical office example described above. In that example, the query MATCH (p:Patient {name:'Rosa Luxemburg', dob: 19841214})-[:HAS]→(dia:Diagnosis)←[:MADE]-(doc: Doctor) RETURN p, dia, doc would, in the absence of the security context and machinery, return the patient details, diagnosis, and doctor responsible to the caller (e.g. a receptionist). By contrast, a security context as disclosed herein in various embodiments would ensure that a caller who is in the role of receptionist would be able to find a doctor who made a diagnosis with respect to a given patient, without also disclosing what that diagnosis was, for example.

The above examples demonstrate that a system as disclosed herein ensures functional correctness despite security. In previous, simplistic security models, data could be read, written, or neither.

Adding traverse permissions, as disclosed herein, ensures the entire subgraph which is required to provide a correct answer to the query can be traversed without fear of it being unduly read or altered. In the example above, if receptionists were denied access to nodes labeled Diagnosis, e.g., to traverse such nodes as disclosed herein, then no match would occur.

Without traverse permissions the graph database would be able to offer only a strictly incorrect (partial) answer (since fewer nodes and relationships can be reached than needed) or expose too much information (since read permission is too liberal for to uphold security during traversal purposes).

In various embodiments, techniques disclosed herein address the problem of performant, fine-grained, correctness-preserving security for graph traversals. In various embodiments, the solution presented is fast, imposing minimal overheads on the execution of a query; it is fine-grained so that administrators can apply the appropriate permissions at the smallest (or largest) or scopes to achieve required security for all users and roles; and it preserves correctness by allowing nodes and relationships in a graph to be traversed by the machinery, but remain unseen by the user.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a memory configured to store security context data associated with a user with respect to a graph database; and
a processor coupled to the memory and configured to:
receive a query associated with the user with respect to the graph database; and
allow a path to be traversed in connection with responding to the query based at least in part on a grant of a traversal right, reflected in the security context data, to traverse one or more of a node and a relationship included in the path, wherein the path has an arbitrary depth comprising one or more relationships and one or more nodes and the processor is configured to allow the path to be traversed at least in part by determining based at least in part on the security context data that the user has the right to traverse the one or more relationships and one or more nodes comprising the path.

2. The system of claim 1, wherein the processor is configured to allow the path to be traversed at least in part by discovering a node associated with the query, discovering a relationship associated with the node, and determining based at least in part on the security context data that the user has the right to traverse the relationship.

3. The system of claim 2, wherein the node comprises a first node, the path includes the first node, the relationship, and a second node, and the processor is configured to allow the path to be traversed at least in part by determining based at least in part on the security context data that the user has the right to traverse the relationship and the second node.

4. The system of claim 1, wherein the path comprises a first path connecting a first node comprising a beginning node of the first path and a second node comprising an end node of the first path; and wherein the processor is configured to allow the first path to be traversed, based at least in part on the traversal right, even in the event that the user does not have the right to traverse a second path between the first node and the second node.

5. The system of claim 1, wherein the processor is configured to allow the path to be traversed, based at least in part on the traversal right, even in the event that the user does not have read access to an intermediate node included in said one or more nodes.

6. The system of claim 1, wherein the processor is configured to allow the path to be traversed, based at least in part on the traversal right, even in the event that the user does not have read access to a relationship included in said one or more relationships.

7. The system of claim 1, wherein the processor is configured to allow read access to data associated with one or more of a node and a relationship comprising the path only to an extent of a read access right included in the security context data.

8. The system of claim 1, wherein the path comprises a first path and the processor is further configured to prevent a second path to be traversed in connection with the query based at least in part on a denial of the traversal right, reflected in the security context data, to traverse one or more of a node and a relationship included in the second path.

9. The system of claim 1, wherein the grant of the traversal right is associated with a node label.

10. The system of claim 1, wherein the grant of the traversal right is associated with a relationship type.

11. A system comprising:
a memory configured to store security context data associated with a user with respect to a graph database; and
a processor coupled to the memory and configured to:
receive a query associated with the user with respect to the graph database;
allow a path to be traversed in connection with responding to the query based at least in part on a grant of a traversal right, reflected in the security context data, to traverse one or more of a node and a relationship included in the path; and
deny access to data associated with both a first attribute associated with an access grant included in the security context data and a second attribute associated with a denial of access included in the security context data.

12. A system comprising:
a memory configured to store security context data associated with a user with respect to a graph database; and
a processor coupled to the memory and configured to:
receive a query associated with the user with respect to the graph database; and
allow a path to be traversed in connection with responding to the query based at least in part on a grant of a traversal right, reflected in the security context data, to traverse one or more of a node and a relationship included in the path, wherein the traversal right does not include read access to data associated with the path.

13. A method, comprising:
storing security context data associated with a user with respect to a graph database;
receiving a query associated with the user with respect to the graph database; and
allowing a path to be traversed in connection with responding to the query based at least in part on a grant of a traversal right, reflected in the security context data, to traverse one or more of a node and a relationship included in the path, wherein the path has an arbitrary depth comprising one or more relationships and one or more nodes and allowing the path to be traversed at least in part by determining based at least in part on the security context data that the user has the right to traverse the one or more relationships and one or more nodes comprising the path.

14. The method of claim 13, wherein allowing the path to be traversed includes discovering a node associated with the query, discovering a relationship associated with the node, and determining based at least in part on the security context data that the user has the right to traverse the relationship.

15. The method of claim 14, wherein the node comprises a first node, the path includes the first node, the relationship, and a second node, and the path is allowed to be traversed at least in part by determining based at least in part on the security context data that the user has the right to traverse the relationship and the second node.

16. The method of claim 13, wherein the path comprises a first path connecting a first node comprising a beginning node of the first path and a second node comprising an end node of the first path; and wherein the first path is allowed to be traversed, based at least in part on the traversal right, even in the event that the user does not have the right to traverse a second path between the first node and the second node.

17. The method of claim 13, further comprising at least one of:
allowing read access to data associated with one or more of a node and a relationship comprising the path only to an extent of a read access right included in the security context data; and
denying access to data associated with both a first attribute associated with an access grant included in the security context data and a second attribute associated with a denial of access included in the security context data.

18. The method of claim 13, wherein the traversal right does not include read access to data associated with the path.

19. A computer program product embodied in a non-transitory computer readable medium, comprising computer instructions for:
storing security context data associated with a user with respect to a graph database;
receiving a query associated with the user with respect to the graph database; and
allowing a path to be traversed in connection with responding to the query based at least in part on a grant of a traversal right, reflected in the security context data, to traverse one or more of a node and a relationship included in the path, wherein the path has an arbitrary depth comprising one or more relationships and one or more nodes and allowing the path to be traversed at least in part by determining based at least in part on the security context data that the user has the right to traverse the one or more relationships and one or more nodes comprising the path.

20. The computer program product of claim 19, wherein allowing the path to be traversed includes discovering a node associated with the query, discovering a relationship associated with the node, and determining based at least in part on the security context data that the user has the right to traverse the relationship.

21. The computer program product of claim 19, wherein at least one of:
the traversal right does not include read access to data associated with the path; and
the computer program product includes computer instructions for at least one of:
allow read access to data associated with one or more of a node and a relationship comprising the path only to an extent of a read access right included in the security context data; and denying access to data associated with both a first attribute associated with an access grant included in the security context data and a second attribute associated with a denial of access included in the security context data.

* * * * *